United States Patent [19]
Rouch et al.

[11] Patent Number: 5,286,932
[45] Date of Patent: Feb. 15, 1994

[54] VACUUM BULB PROVIDED WITH ELECTRICAL INSULATION

[75] Inventors: Robert Rouch, Pouyastruc; Michel Descazeaux, Soues, both of France

[73] Assignee: GEC Alsthom SA, Paris, France

[21] Appl. No.: 918,033

[22] Filed: Jul. 24, 1992

[30] Foreign Application Priority Data

Jul. 26, 1991 [FR] France ................... 91 09508

[51] Int. Cl.$^5$ ........................................ H01H 33/66
[52] U.S. Cl. ........................................... 200/144 B
[58] Field of Search .................................. 200/144 B

[56] References Cited

U.S. PATENT DOCUMENTS

| | | | |
|---|---|---|---|
| 2,870,298 | 1/1959 | Schwager | 200/144 B |
| 2,872,550 | 2/1959 | Schwager | 200/144 B |
| 3,594,525 | 7/1971 | Miller et al. | 200/144 B |
| 3,855,435 | 12/1974 | Himi | 200/144 B |
| 3,955,167 | 5/1976 | Kumberg | 200/144 B X |
| 4,393,286 | 7/1983 | Takagi | 200/144 B |
| 4,618,749 | 10/1986 | Bohme et al. | 200/144 B |
| 4,661,791 | 4/1987 | Wakasugi et al. | 200/144 B X |

FOREIGN PATENT DOCUMENTS

| | | |
|---|---|---|
| 0187950 | 7/1986 | European Pat. Off. . |
| 0196503 | 10/1986 | European Pat. Off. . |
| WO9106106 | 5/1991 | PCT Int'l Appl. . |
| 1191664 | 5/1970 | United Kingdom . |
| 2029643 | 3/1980 | United Kingdom . |

Primary Examiner—J. R. Scott
Attorney, Agent, or Firm—Sughrue, Mion, Zinn, Macpeak & Seas

[57] ABSTRACT

A vacuum bulb for interrupting an electrical circuit, the bulb comprising two electrical poles enabling an electrical connection to be established between the outside and interrupting contacts placed inside the bulb, the body of the bulb being dielectrically reinforced by an outside insulator disposed on the bulb between the two electrical poles, wherein the insulator is constituted by a polymer sheath heat-shrunk directly onto the body of the bulb.

4 Claims, 1 Drawing Sheet

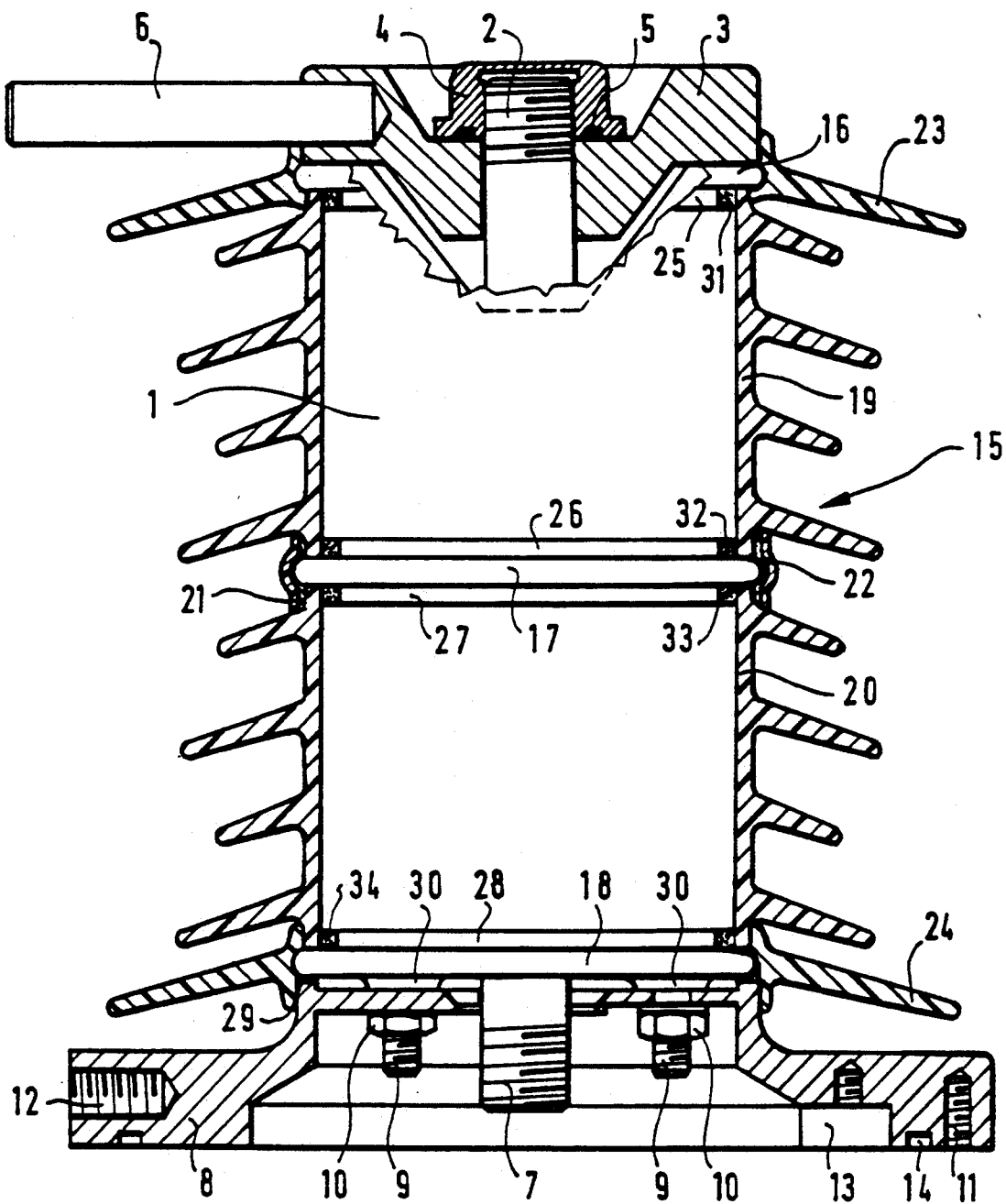

VACUUM BULB PROVIDED WITH ELECTRICAL INSULATION

The present invention relates to a vacuum bulb provided with electrical insulation, in particular for use in a polluted atmosphere specific to certain industries or in the outside atmosphere, e.g. in railway applications.

BACKGROUND OF THE INVENTION

Vacuum bulbs are used in electrical current-interrupter devices. A vacuum bulb is constituted by a cylinder of insulating material fitted with two facing electrical contacts. One of the contacts is stationary and the other is moving to enable the contacts to be separated or to be brought together. The contacts are connected to external conducting flanges placed on opposite faces of the bulb, which flanges enable electrical connections to be made with external lines or circuits.

The vacuum established inside the bulb provides the required dielectric strength and interrupting power in a small volume. However, it is necessary to provide a creepage distance outside the bulb of sufficient length to guarantee overall isolation between the contacts. Bulbs are then fitted with electrical insulators having fins in order to obtain creepage distances of sufficient length.

Such isolators are conventionally made of ceramics. An insulator is placed around a vacuum bulb between its flanges. The space between the bulb and the insulator is filled with a filler resin that must have very good adherence qualities and that must not shrink in order to avoid allowing a layer of air to form between the bulb and the resin or between the resin and the electrical insulator.

Ceramic insulators suffer from a certain number of drawbacks.

They are heavy, and above all they are brittle which makes them particularly sensitive to vandalism. When placed on the roof of a rail vehicle, their relatively large volume gives rise to drag.

As a replacement for ceramic material, it is known that a resin can be molded over a vacuum bulb to form an insulator. Appropriate resins include epoxies such as those sold under the trademark Araldite, after treatment to enable them to withstand ultraviolet radiation. However, such materials are also fragile, and in operation they require significant thicknesses, thereby giving rise to high weight.

Document WO 91/06106, filed in the name of Raychem Limited, discloses a high tension insulator having a polymer core which provides it with good mechanical strength and which is protected on the outside by a sheath of heat-shrink polymer which is electrically insulating and which withstands leakage currents, said sheath being provided with fins on its outside surface.

To mitigate the drawbacks of prior art vacuum bulbs provided with electrical insulation, the present invention seeks to dispose electrically insulating heat-shrink substances such as those disclosed in WO 91/06106 directly on a vacuum bulb. Such substances provide very good shock resistance because they are flexible and they enable insulators to be obtained that are compact and light in weight.

SUMMARY OF THE INVENTION

The invention therefore provides an insulated vacuum bulb for interrupting an electrical circuit, the bulb comprising two electrical poles enabling an electrical connection to be established between the outside and interrupting contacts placed inside the bulb, the body of the bulb being dielectrically reinforced by an outside insulator disposed on the bulb between the two electrical poles, wherein the insulator is constituted by a polymer sheath heat-shrunk directly onto the body of the bulb.

Advantageously, the sheath includes fins on its outside surface. It may be built up from a plurality of lengths.

BRIEF DESCRIPTION OF THE DRAWING

The invention will be better understood and other advantages and features will appear on reading the following description given by way of non-limiting example and referring to the accompanying drawing in which the sole FIGURE shows a vacuum bulb provided with electrical insulation in accordance with the invention.

DETAILED DESCRIPTION

The accompanying FIGURE is a section on the axis of symmetry of the device, excluding the vacuum bulb 1 of insulating material such as porcelain or ceramic which is shown only in part in the section.

The bulb includes a top threaded rod 2 which terminates inside the bulb in a stationary contact. The top rod 2 which is stationary relative to the bulb passes through a top flange 3 and secures the flange against the top face of the bulb by means of a plug nut 4. The top flange is made of metal, e.g. copper or aluminum. The plug nut may be made of copper. An O-ring 5 is included in the assembly to seal it against water and other polluting fluids. The top flange 3 is intended to receive a metal rod 6 which is brazed or soldered to the flange for the purpose of providing an electrical connection with the outside, e.g. to a pantograph in a rail application.

A bottom threaded rod 7 extends from the bottom face of the vacuum bulb. It is terminated inside the bulb by a moving contact situated facing the stationary contact secured to the top rod 2. A metal bellows system connected to the rod 7 provides sealing inside the bulb while allowing the rod 7 to move axially. Such displacement may be controlled by a piston, for example. The rod 7 passes through a metal bottom flange 8 fixed to the bottom face of the vacuum bulb by means of three threaded rods 9 secured to the bottom face and disposed at 180° intervals from one another, the rods 9 co-operating with three nuts 10 screwed thereon.

The bottom flange 8 is fixed to a support, e.g. by means of another insulator, via screws engaging in tapped holes 11. Reference 12 designates a tapped hole for receiving a bottom electrical connection. The electrical connection between the bottom flange 8 and the rod 7 takes place via three conductive braids electrically connected firstly to the bottom flange and secondly to a conductive plate which is electrically and mechanically connected to the bottom rod. Partially tapped hole 13 constitutes one of the points for fixing the conductive braids to the bottom flange. The face of the bottom flange facing away from the bulb also includes an annular groove 14 for receiving a sealing O-ring.

Between the bottom and top flanges, overall reference 15 designates an electrical insulator. For practical reasons, it is made up of a plurality of parts. Given that the vacuum bulb includes a top collar 16, a middle collar 17, and a bottom collar 18, the insulator comprises a first finned sheath 19 between the top and middle collars and a second finned sheath 20 between the middle and bottom collars. To ensure continuity of the insulator, two small sheaths 21 and 22 are superposed on the middle collar. It is also possible to apply fins 23 and 24 to the end collars in order to increase the length of the creepage distance.

If, as shown in the accompanying FIGURE, the surface of the bulb is provided with grooves or hollows, then these grooves or hollows should be filled with a material of the same nature as the insulator, or with a material having equivalent insulating properties, in order to provide a structure that is as uniform as possible. Thus, grooves 25, 26, 27, and 28 adjacent to the collars 16, 17, and 28 may be filled with a mastic installed by taping and represented in the FIGURE by references 31, 32, 33, and 34.

The electrical insulator 15 is installed as follows. After all the grooves on the cylindrical face of the bulb have been filled, the bulb 1 on its own has the finned sheaths 19 and 20 and the small sheaths 21 and 22 threaded thereover.

These sheaths are thus made of a heat-shrink material of the type described in Document WO 91/06106. The inside diameter of the sheaths 19 and 20 is slightly greater than the outside diameter of the bulb and the inside diameters of the small sheaths 21 and 22 are chosen accordingly.

There is no need to insert any material between the bulb and the sheaths other than the material necessary for filling the grooves or interstices. The sheaths are shrunk by being heated, e.g. by using a hot air blower or a vacuum furnace. The sheaths mounted on the bulb can thus be preheated in an ordinary furnace to 80° C. and then the assembly can be quickly transferred into a vacuum furnace that has previously been raised to a temperature lying in the range 225° C. to 235° C. The furnace is then evacuated (to less than 50 millibars) in less than one minute so as to evacuate the air lying between the sheaths and the bulb. Heating then continues at the indicated temperature for about 20 minutes in order to shrink the sheaths.

It is preferable to install two sheaths 21 and 22 rather than a single sheath in order to increase mechanical resistance against tearing.

Thereafter, the top fin 24 and the top flange 3 are installed, with the flange being secured to the bulb by tightening the nut 4.

This fin is then shrunk. Thereafter, the bottom fin is installed on the bottom flange. A ring 29 of epoxy resin is disposed on the top face of the bottom flange 8 and the vacuum bulb is placed on the flange. The resin 29 which polymerizes at ambient temperature fills the space that exists between the bottom flange and the bulb which rests on said flange via shoulders 30. The fin 24 is placed at the desired height and it is shrunk.

Because of the temperatures used, it is preferable to install the O-ring 5 after the shrinking operations have been performed.

We claim:

1. An insulated vacuum bulb for interrupting an electrical circuit comprising a bulb having a substantially cylindrical outer surface and having top and bottom terminals disposed at opposite ends of said bulb, a fixed electrical pole and a movable electrical pole extending through and connected to said terminals, respectively with interrupting contacts disposed on said poles within said bulb and outside insulator means disposed on said outer surface of said bulb and extending between said terminals for dielectrically reinforcing said bulb, wherein said insulator means is comprised of at least one polymer sheath heat-shrunk directly onto and covering said substantially cylindrical surface of said bulb.

2. An insulated vacuum bulb as set forth in claim 1, wherein said at least one sheath includes fins on an outer surface thereof.

3. An insulated vacuum bulb as set forth in claim 1, wherein said insulator means is comprised of a plurality of partially overlapping polymer sheaths each of which is heat-shrunk directly onto said substantially cylindrical surface of said bulb.

4. An insulated vacuum bulb as set forth in claim 1, further comprising at least one recess in said outer surface and additionally insulating material disposed in and filling said at least one recess.

* * * * *